United States Patent
LaFlesh et al.

(10) Patent No.: US 9,321,002 B2
(45) Date of Patent: Apr. 26, 2016

(54) REMOVAL OF MERCURY EMISSIONS

(75) Inventors: Richard C. LaFlesh, Suffield, CT (US); John Iovino, Simsbury, CT (US); Shin Gyoo Kang, Simsbury, CT (US); Carl D Edberg, Stafford Springs, CT (US); Raymond W. Cournoyer, Enfield, CT (US)

(73) Assignee: ALSTOM Technology Ltd, Baden (CH)

( * ) Notice: Subject to any disclaimer, the term of this patent is extended or adjusted under 35 U.S.C. 154(b) by 238 days.

(21) Appl. No.: 13/552,758

(22) Filed: Jul. 19, 2012

(65) Prior Publication Data

US 2013/0078169 A1  Mar. 28, 2013

Related U.S. Application Data

(60) Provisional application No. 61/538,475, filed on Sep. 23, 2011.

(51) Int. Cl.
| | |
|---|---|
| *B01D 53/02* | (2006.01) |
| *B01D 53/12* | (2006.01) |
| *B01D 53/64* | (2006.01) |
| *B01D 53/83* | (2006.01) |
| *F23J 15/02* | (2006.01) |
| *B01D 53/08* | (2006.01) |

(52) U.S. Cl.
CPC .............. *B01D 53/12* (2013.01); *B01D 53/64* (2013.01); *B01D 53/83* (2013.01); *F23J 15/02* (2013.01); *B01D 53/08* (2013.01); *B01D 2253/102* (2013.01); *B01D 2257/602* (2013.01); *F23J 2215/60* (2013.01); *F23J 2219/30* (2013.01)

(58) Field of Classification Search
CPC ................... B01D 2253/102; B01D 2257/602; B01D 53/08; B01D 53/12; B01D 53/64; B01D 53/83; F23J 15/02; F23J 2215/60; F23J 2219/30
See application file for complete search history.

(56) References Cited

U.S. PATENT DOCUMENTS

| | | | |
|---|---|---|---|
| 6,848,374 B2 | 2/2005 | Srinivasachar et al. | |
| 7,282,189 B2 * | 10/2007 | Zauderer | 423/220 |
| 7,744,678 B2 | 6/2010 | Laudet et al. | |
| 7,780,765 B2 | 8/2010 | Srinivasachar et al. | |
| 8,069,797 B2 | 12/2011 | Srinivasachar et al. | |
| 2005/0039598 A1 * | 2/2005 | Srinivasachar et al. | 95/134 |
| 2008/0292512 A1 * | 11/2008 | Kang | 422/172 |
| 2010/0233052 A1 | 9/2010 | Chao et al. | |

FOREIGN PATENT DOCUMENTS

CN                101126592 A        2/2008

OTHER PUBLICATIONS

First Office Action issued by the Chinese Patent Office on Jan. 29, 2015 for CN Application No. 201280046161.3.

* cited by examiner

*Primary Examiner* — Christopher P Jones
(74) *Attorney, Agent, or Firm* — Robert D. Crawford

(57) ABSTRACT

A system for removing gaseous pollutants, such as mercury from flue gases of a solid-fueled furnace (17), includes a sorbent mill (34) that receives superheated steam and a sorbent (28), such as activated carbon, in a partially agglomerated state, that processes the sorbent (28) by de-agglomerating and comminuting the sorbent (28). An educator (35) transports the processed sorbent (28) to a distributor (36) that injects it into the flue gases at a contact location having a temperature between 500° F. and 900° F., whereupon the sorbent (28) adsorbs mercury from the flue gas. A particle collection device (24) removes the processed sorbent (28) having adsorbed mercury, from the flue gas.

20 Claims, 2 Drawing Sheets ical Patent Application Ser. No. 61/538,475, filed Sep. 23, 2011. The present application is also related to U.S. Pat. No. 7,780,765 issued Aug. 24, 2010 that was a continuation of U.S. patent application Ser. No. 10/961,697, filed Oct. 8, 2004, which is a continuation-in-part of U.S. patent application Ser. No. 10/453,140, filed Jun. 3, 2003, now U.S. Pat. No. 6,848,374, all of which are incorporated by reference as if they were set forth in their entirety herein.

BACKGROUND OF THE INVENTION

The present invention relates to apparatus and a method for removing gaseous pollutants from the flue gas of solid fuel fired steam generators and more particularly to apparatus and a method for removing elemental mercury and mercury compounds from the flue gases from coal fired boilers.

The use of activated carbon and carbonaceous particles for the adsorption of pollutant gases, such as mercury vapor has been successfully demonstrated in various applications, such as municipal waste incineration. However, there are significant differences in the concentration of mercury from waste incinerators compared to coal-fired power plants with the concentration from the coal-fired power plants being anywhere from 10 to 100 times lower. Also, the mercury from waste incinerators is usually in the form of mercury chloride whereas a larger percentage of mercury from coal-fired power plants is usually in the form of elemental mercury. Both of these differences make it more difficult to remove the mercury from the flue gas from a coal-fired power plant.

The efficiency of the sorbent is limited by its surface area to mass ratio. A relatively large particle has a low available surface area/mass ratio that limits the adsorption of pollutant gas. Using a carbonaceous sorbent with mean particle size of about 5 microns with a maximum size of about 10 microns would improve adsorption efficiency, but storage, handling, transport and dispersion of these small particles is extremely difficult.

In conventional methods, the sorbent particles are injected in the flue gas duct upstream of particulate removal device such as baghouses and electrostatic precipitators and downstream of air heaters. The particle removal devices then collect the sorbent with the adsorbed the pollutant gases.

U.S. Pat. No. 7,780,765 issued Aug. 24, 2010 describes the injection of activated carbon into flue gas by using injected compressed air. This reduces mercury emissions in flue gases, but can become quite costly due to the need for equipment to provide the compressed air and the power the equipment uses.

It is also known in the art that vapor phase mercury in the flue gas emerging from the high temperature boiler is in the form of elemental mercury. Oxidation of elemental mercury to oxidized mercury ($Hg^{2+}$) is beneficial to mercury control since it can be removed more easily by carbonaceous sorbent. Similarly, combination of elemental mercury with halogens, results in a compound that has greater affinity for the sorbent.

Currently, there is a need for a system that efficiently and economically removes gaseous pollutants, such as elemental mercury and mercury compounds from combustion flue gases of solid fueled boilers.

SUMMARY OF THE INVENTION

The present invention may be embodied as a method for removing gaseous pollutants from flue gases generated by solid fuel fired boiler, the method comprising:

providing a carbonaceous sorbent in powdered form potentially having some agglomeration;
extracting superheated steam from the boiler;
processing the superheated steam to provide dry, high quality superheated steam of the proper pressure, temperature that is below a predetermined moisture content;
providing the processed steam to a sorbent mill to process the sorbent to deagglomerate it and to break the particles of the powdered sorbent into a greater number of smaller particles;
injecting the processed sorbent into contact with the flue gas to adsorb mercury and mercury compounds; and
removing the sorbent having mercury adsorbed thereon from the flue gas.

The present invention may also be embodied as a pollution removal device for more efficiently removing pollutant gases from flue gases of a solid-fueled steam generator comprising:
a sorbent source for providing carbonaceous sorbent in powdered form;
a steam tap line for extracting superheated steam from said boiler 18;
a steam processing device coupled to the steam tap line for receiving the superheated steam from the steam tap line and for processing the steam to provide steam of a desired pressure, temperature and moisture content;
a sorbent mill coupled to the steam processing device and the sorbent source, adapted to receive sorbent from the sorbent source, and employ the processed steam to process the sorbent by de-agglomerating and comminuting particles in the sorbent;
a distributor coupled to the sorbent mill adapted to receive the sorbent and to inject the sorbent into said flue gases of the boiler thereby adsorbing the gaseous pollutant; and
a particulate collection device adapted to collect the solid particles in the flue gas and remove them from the gases.

An object of the present invention is to provide a more efficient method of removing gaseous pollutants from flue gases.

Another object of the present invention is to provide a more efficient method of removing mercury and mercury compounds from flue gases.

Another object of the present invention to provide a more cost effective means of removing gaseous pollutants from flue gases.

It is another object of the present invention to provide a more cost effective costly means of removing mercury from flue gases.

Other objects and advantages of the invention will become apparent from the drawings and specification.

BRIEF DESCRIPTION OF THE DRAWINGS

The present invention may be better understood and its numerous objects and advantages will become apparent to those skilled in the art by reference to the accompanying drawings in which.

DETAILED DESCRIPTION OF THE PREFERRED EMBODIMENT

Figure 1:
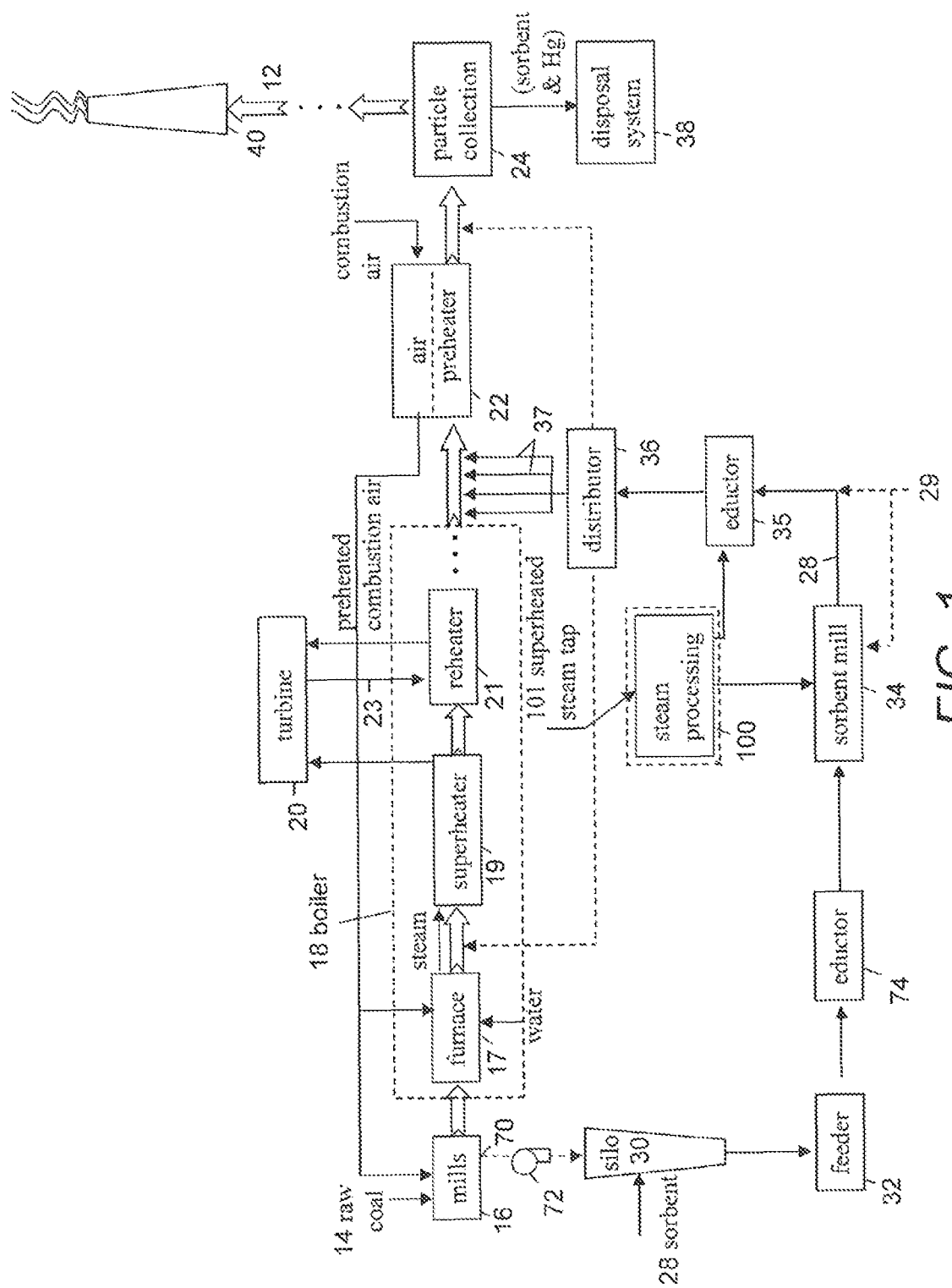
FIG. 1 is a schematic diagram of a first embodiment of a system in accordance with the present invention for removing gaseous pollutants from the flue gases created by a solid fueled boiler.

FIG. 1 shows an embodiment of the present invention incorporated into a solid fuel fired steam generator or boiler 18. This may be part of a coal-fired power plant.

The raw coal 14 is fed to at least one pulverizer/crusher, each referred to as a mill 16 where the raw coal is reduced to desired particulate size. Ambient air is provided to an air preheater 22 that preheats the air. The preheated air is provided as primary air to the mills 16 that carries the solid fuel particles that were pulverized in mills 16, to the furnace 17 of boiler 18, where the fuel particles are burned to boil water into steam.

Air preheater 22 also provides secondary air directly to furnace 17.

The temperature of the flue gases leaving the furnace 17 ranges from 1400 to 2200° F.

The steam created in the furnace 17 is provided to superheater 19. The hot flue gases are also provided to superheater 19. The superheater transfers heat from the flue gases to the steam creating superheated steam in headers typically at 600 psig that is provided to a steam turbine 20. The flue gases exit the superheater 20 with a temperature that is approximately 600 to 800° F.

The steam turbine 20 does various work, such as turning a generator to create electricity. The superheated steam that returns after running through at least one stage of steam turbine 20 is provided to a cold reheat inlet 23 of a reheater 21. The reheater 21 receives the flue gas and transfers the heat to the steam being returned from the steam turbine 20 to reheat it and returns the reheated steam to another stage of the steam turbine 20.

Some of the superheated steam returning from the turbine is routed, as one example, to a steam processing device 100, which will be discussed in more detail below.

The flue gases are then routed through the air preheater 22. Heat from the flue gases is transferred to the atmospheric inlet air that will be used as the primary and secondary air in the mills 16 and the furnace 17.

Flue gases exit the air preheater 22 with a temperature range from 220 to 370° F. and enter a particle separation device 24. The particle separation device 24 may be an electrostatic precipitator (ESP), a fabric filter 24 or other known device for collecting solid particulates entrained in a gas. The particle separation device 24 collects the solid particulates and provides them to a disposal system 38 for disposal.

A carbonaceous sorbent 28 in powdered form, such as activated carbon particles, or other carbon particles is stored in a silo 30. The sorbent 28 in silo 30 typically clumps together because very small particles thereof tend to stick to each other and agglomerate.

Accordingly, the sorbent 28 is fed by a feeder 32 to an eductor 74 that provides the sorbent 28 to a sorbent mill 34. Since this eductor is typically a significant distance from the sorbent mill 34, it is best to use air as a transport medium to blow the sorbent 28 to the sorbent mill 34. There is a risk of dropping the temperature to a level where condensation occurs if steam were used as the transport medium in this part of the system.

Superheated steam is provided from the cold reheat inlet 23 of the reheater 21. In this example, other sources of superheated steam are also available from boiler 18, including blending of streams of steam. This passes through the steam tap 101 to the steam processing device 100 that processes the superheated steam to reduce the pressure and temperature of the superheated steam, and to remove any residual condensation. The steam processing device 100 may also recover some heat energy for use elsewhere in the plant.

The processed steam is provided to the sorbent mill 34. The sorbent mill 34 breaks up the clumps in the sorbent 28 and de-agglomerates it. The sorbent mill 34 also operates to comminute the sorbent particles into a greater number of particles having a smaller size. The smaller size increases the available surface/mass ratio, allowing faster reaction time, while the greater number of particles causes a greater dispersion in the flue gases and increases the chances that the particles will physically contact the mercury gases, increasing the efficiency of the system.

Once the sorbent 34 is deagglomerated and comminuted, it is provided to a steam eductor 35 and/or piping to receive the processed steam from steam processing device 100 as the motive force. The steam eductor 35 and/or piping then sends the processed sorbent 28 to a distributor 36.

One such type of sorbent mill 34 compatible with the present invention is a jet mill. In prior art systems, air was compressed and forced into the separation device to cause clumps of agglomerated particles to be broken up. It required significant auxiliary plant energy to compress air to the point required by the separation device.

The present invention does not use compressed air as the energy source for de-agglomeration and comminuting the activated carbon particles. It uses superheated steam available in the power plant or facility. The logic of using steam is contrary to accepted logic, since steam typically has moisture and moisture causes agglomeration of powders.

However, by keeping the temperature above the condensation point, the moisture does not come out of its gaseous form, and does not create liquid droplets. In fact, superheated steam actually removes moisture from a powdered sorbent, reducing agglomeration.

Unfortunately, the pressure of the superheated steam in the headers of the system is on the order of 550 psig, or more. This is much higher than the pressure that can be used by the sorbent mill 34, typically about 100 psig. If the pressure of the superheated steam is too high, the separation device 34 can become damaged or non-functional. The cold reheat inlet 23 is available as one potential source for superheated steam. The cold reheat inlet can have superheated steam at a pressure of about 600 psig and a temperature of 635 Deg. F. Therefore, the steam must be modified to reduce the pressure and temperature.

During start-ups and shut-downs, the steam tap will have a temperature below that of the condensation temperature. As a result, moisture forms in the steam tap 101. As indicated above, moisture causes agglomeration, which reduces the efficiency of the system and should be avoided. Therefore, the superheated steam must be processed to result in the proper pressure/temperature while also removing moisture or condensation.

Figure 2:
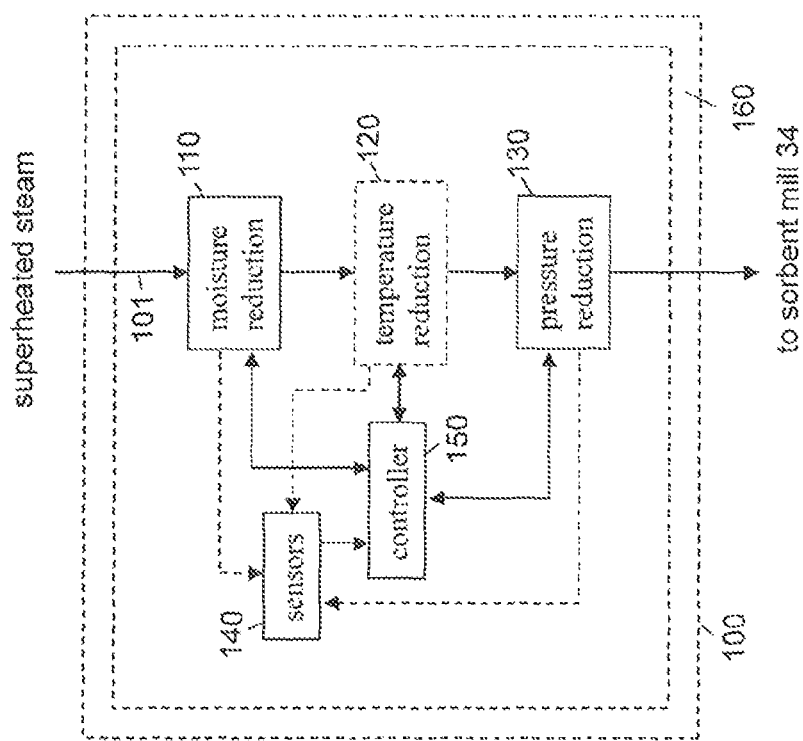
FIG. 2 is a more detailed, enlarged view of one example of a steam processing device of FIG. 1.

FIG. 2 shows a more detailed diagram of the steam processing device 100 of FIG. 1. Steam processing device 100 employs a moisture reduction unit 110 that may include water traps and/or driers that remove condensation from the superheated steam.

The superheated steam is then provided to a temperature reduction unit 120 that may include water sprayers and/or heat exchangers to de-superheat the steam provided to it. The temperature of the steam may be reduced by spraying small amounts of water into the steam. This amount must be accurately calculated and metered so that it will all remain in the vapor phase and not cause condensation throughout its use in the system.

The superheated steam is provided to the pressure reduction unit 130 that may include pressure reduction valves that can be operated by an external controller.

There are sensors 140 that measure at least one of the pressure and temperature in one or more locations in the steam processing device 100. These sensors 140 feed their measurements to a controller 150, which may be part of the steam processing device 100, or external to it.

Controller 150 functions, if necessary to read sensor input from the Moisture reduction unite 110 to determine if there is condensation that should be removed. Controller 150 then actuates water trap valves and other equipment such as driers to remove the condensate. The controller 150 may also read valve settings, flow rates, total accumulated water removed, etc. to make its calculations and actuate parts of temperature reduction unit 120.

The controller 150 reads sensors 140 to determine the temperature and pressure, mass flow rate and other necessary parameters of the superheated steam at the location of the temperature reduction unit 120, to calculate the proper amount of water to spray into the superheated steam. It also operates to actuate valves within temperature reduction unit 120 to dispense the proper amount of water calculated if de-superheat spray is required.

Controller 150 also receives input from the sensors 140 indicating the temperature, pressure, mass flow rate and other necessary parameters of the superheated steam at the location of the pressure reduction unit 130, to calculate the proper valve opening for pressure reduction valves within the pressure reduction unit 130.

In one embodiment, the sensors 140 and controller 150 interactively perform their duties to provide superheated steam of a pressure of approximately 100 psig, temperature of 550 Deg. F. with minimal moisture.

Controller 150 may receive input and data from other processors of the system and/or operator input.

The processed steam is provided to the sorbent mill 34. Superheated steam has superheated water in vapor form. This has significantly more enthalpy than compressed air used in prior art devices.

The inherent energy in the superheated steam is expended during the deagglomeration and comminution of the sorbent 28. This results in finer grinding and at significantly reduced operating energy costs. The finer grinding allows more particles to be dispersed in the same volume. This reduces the spacing between particles and increases the probability that a sorbent particle comes in contact with the pollutant gases.

The sorbent mill 34 may be a particle-particle separator or a jet mill, where high-pressure, superheated steam is the energy source.

Sorbent mill 34 performs three functions: particle-particle deagglomeration; particle size reduction; and classification of particles into a) fine particles to use and/or b) coarse particles to return to the silo 30 or retention or return for further milling (particle size reduction).

Some of the larger particles are comminuted by device 34. The resulting carbonaceous sorbent has a particle size distribution of carbonaceous sorbent of $d_{50}$<15 microns, where $d_{50}$ represents 50% of the particles by mass in the entire distribution in the carbonaceous sorbent 28.

The target particle size distribution is $d_{50}$<15 microns, preferably $d_{50}$<8 microns and most preferably $d_{50}$<4 micron.

The static pressure of air leaving the separation device 34 is typically above atmospheric pressure. A steam eductor 35 connected to sorbent mill 34 moves the processed sorbent 28 to the distributor 36. A pressure of about 1-5 psig is preferred.

Distributor 36 having multiple injection lances 37 that inject the processed sorbent 28 into the flue gases, preferably between the reheater 21 and the air heater 22. This causes the sorbent 28 to be disbursed throughout the flue gases that come in physical contact with, and adsorbs gaseous pollutants, such as elemental mercury and mercury compounds in the flue gas. Dioxins and furans may also be adsorbed by the sorbent 28, as well as certain other hazardous elements and compounds such as HCl, selenium, arsenic, antimony, beryllium, cadmium, cobalt, lead, manganese, nickel, and others.

The sorbent 28 may also be injected into the flue gas stream 12 between the boiler 18 and the convective pass/superheater 20, between the convective pass/superheater 20 and the air preheater 22, or between the air preheater 22 and the ESP/fabric filter 24.

Thus, the system for removing elemental mercury or mercury compounds handles carbonaceous sorbent 28.

In an alternative embodiment, a portion of the coal pulverized in the pulverizer 16 is extracted at a location 70 from the pulverizer as sorbent 28. Preferably between 10 to 1000 lb/hr of coal (about 0.01 to 1.0 percent of total coal feed to boiler), more preferably between 50 and 500 lb/hr, and most preferably between 100 and 200 lb/hr is extracted at the location 70. A blower 72 may be required to provide the necessary motive force for moving the extracted sorbent solids 28.

As an alternative embodiment, superheated steam is sourced for tap 101 and used directly in a sorbent mill 34 without steam processing 100. Heat energy recovered may or may not be extracted with this arrangement.

The extracted sorbent solids 28 are subjected to one or more processes. The sorbent solids 28 may be sprayed with a solution 29 to deposit a halogen on the surface of the sorbent particles 28. The solution 29 is chosen from potassium iodide, iodine dissolved in potassium iodide, alkali halides (e.g. NaCl), and halide salts (e.g. $CaCl_2$), or halogen acids (e.g. HCl, HI, HBr, HF) dissolved in water. A typical additive amount is expected to have a halogen concentration in the sorbent 28 of about 0 to 10 percent by weight.

Additives 29 may also be added by injecting them into the sorbent mill 34 and mixing them with the carbonaceous sorbent 28 and heating them to a temperature that will volatilize the additive locally but distribute it by subsequent adsorption on the carbon. It is preferred that the temperature to which the carbonaceous material and additive are heated is above 400 Deg. ° F. and most preferably above 500 Deg. F, to ensure that it will be stable when injected in the flue gas at those temperatures. An example of additive 29 that can be incorporated in the above fashion is iodine or bromine. These additives 29, when added to the sorbent mill 34 are more efficiently incorporated into the processed sorbent 28, and will have greater efficiency in adsorbing gaseous pollutants.

The steam tap 101 explained in the above embodiment extracts superheated steam from the cold reheat inlet header 23 typically at 635 Deg. F. and a pressure of 600 psig. In other embodiments of the present invention, the steam tap 101 may extract superheated steam from other locations within the boiler 18. For example, the steam tap 101 could come off of:

1) the low temperature superheater inlet header. This steam is typically at 650-850 Deg. F. and 2600-3000 psig;

2) the superheater de-superheater outlet header at 650-850 Deg. F. and 2600-3600 psig;

3) the superheater outlet header at 900-1150 Deg. F. and 2500-3600 psig;

4) the reheater outlet header at 900-1150 Deg. F. and 500-700 psig;

5) the wall sootblower stations. The temperature and pressure of these vary. All of these will require differing amounts of pressure and temperature reduction that can be interactively applied by the present invention.

Several advantages of the present invention above prior art devices include the ability to grind the sorbent 28 to a finer powder to reduce moisture in the processed sorbent (28). The reduced moisture thereby reduces corrosion within the equipment of the system. Also, it was noted that by using superheated steam instead of compressed air, there was less static electricity in the sorbent. This reduced the magnetic attraction of the particles and their tendency to magnetically agglomerate in the flue gases.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A pollution removal device for more efficiently removing pollutant gases from flue gases of a solid-fueled steam generator comprising:
a silo to store carbonaceous sorbent in a powdered form;
a steam tap line to extract superheated steam from a superheated steam source;
a steam processing device fluidly coupled to the steam tap line to receive the superheated steam from the steam tap line and operable to reduce a temperature, pressure and moisture content of the superheated steam to provide a processed steam of a desired pressure, temperature and moisture content;
a sorbent mill fluidly coupled to the steam processing device and the silo to receive the carbonaceous sorbent and the processed steam and operable to de-agglomerate and comminute the carbonaceous sorbent using the processed steam to provide a processed sorbent;
a distributor fluidly coupled to the sorbent mill operable to receive the processed sorbent inject the processed sorbent into the flue gases at a desired location in the solid-fueled steam generator thereby adsorbing the pollutants therefrom; and
a particulate collection device arranged fluidly downstream from the desired location, and operable to collect and thereby remove the carbonaceous sorbent from the flue gas.

2. The pollution removal device of claim 1, wherein the carbonaceous sorbent is powdered activated carbon.

3. The pollution removal device of claim 1, further comprising a mill used to pulverize a raw solid carbonaceous fuel to form carbonaceous sorbent in powdered form.

4. The pollution removal device of claim 1, wherein the steam tap line extracts superheated steam from a low temperature superheater inlet header for supply to the steam processing device.

5. The pollution removal device of claim 1, wherein the steam tap line extracts superheated steam from a superheater de-superheater outlet header for supply to the steam processing device.

6. The pollution removal device of claim 1, wherein the steam tap line extracts superheated steam from a superheater outlet header for supply to the steam processing device.

7. The pollution removal device of claim 1, wherein the steam tap line extracts superheated steam from a reheater outlet header for supply to the steam processing device.

8. The pollution removal device of claim 1, wherein the steam tap line extracts superheated steam from wall sootblower stations for supply to the steam processing device.

9. The pollution removal device of claim 1, wherein the steam tap line extracts superheated steam from a turbine intermediate stage source for supply to the steam processing device.

10. The pollution removal device of claim 1, wherein the sorbent mill is a jet mill.

11. The pollution removal device of claim 1, further comprising a steam educator to convey the processed sorbent from the sorbent mill to the distributor using a portion of the processed steam as a motive force.

12. The pollution removal device of claim 11, further comprising an air educator to convey the carbonaceous sorbent from the silo to the sorbent mill using air as the transport medium.

13. The pollution removal device of claim 1, wherein the temperature of the processed steam is greater than a condensation point.

14. The pollution removal device of claim 1, wherein the steam processing device includes at least one of a heat exchanger and a water sprayer to reduce the temperature of the superheated steam.

15. The pollution removal device of claim 14, wherein the steam processing device includes at least one pressure reduction valve to reduce the pressure of the superheated steam.

16. The pollution removal device of claim 15, wherein the steam processing device includes at least one of a water trap and a drier to reduce condensation of the superheated steam.

17. The pollution removal device of claim 1, further comprising:
at least one sensor that provides at least one signal indicative of at least one of the pressure, temperature, and mass flow rate of the superheated steam; and
a controller that controls at least one pressure control valve of the steam processing device to reduce the pressure of the superheated steam in accordance with the at least one signal.

18. The pollution removal device of claim 1, further comprising:
at least one sensor that provides at least one signal indicative of at least one of the pressure, temperature, and mass flow rate of the superheated steam; and
a controller that operates at least one of a water trap and a drier to reduce condensation of the superheated steam in accordance with the at least one signal.

19. The pollution removal device of claim 1, further comprising:
at least one sensor that provides at least one signal indicative of moisture content of the superheated steam; and
a controller that controls at least one moisture control valve of the steam processing device to reduce the temperature of the superheated steam in accordance with the at least one signal.

20. The pollution removal device of claim 1, wherein the distributor provides the processed sorbent to the flue gas upstream of a pre-heater.

* * * * *